C. STEENSTRUP.
METHOD OF MANUFACTURING TURBINE BLADES.
APPLICATION FILED APR. 20, 1917.

1,260,588.

Patented Mar. 26, 1918.

Inventor:
Christian Steenstrup,
by
His Attorney.

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

METHOD OF MANUFACTURING TURBINE-BLADES.

1,260,588.  Specification of Letters Patent.  Patented Mar. 26, 1918.

Application filed April 20, 1917. Serial No. 163,514.

*To all whom it may concern:*

Be it known that I, CHRISTIAN STEENSTRUP, a citizen of the United States, residing at Schenectady, in the county of Schenectady, State of New York, have invented certain new and useful Improvements in Methods of Manufacturing Turbine-Blades, of which the following is a specification.

In the manufacture of blades for certain types of turbines it is customary to take solid round stock and by means of milling cutters shape or form the blades therefrom. These blades, as is well known, have a concave working face and a convex back, the entrance and exit edges being sharpened to practically knife edges so as to reduce shocks in the entering steam or other elastic fluid. In addition to the milling operations it is necessary in some cases, notably with the larger blades, to file those portions of the back adjacent the sharpened edges. In all cases it is customary to polish the entire concave working face, and in most cases the backs as well. As a net result of all these operations the blades are very expensive to manufacture. This is particularly true due to the large amount of stock which has to be wasted in the milling operations. Roughly speaking, the amount of scrap metal in some sizes of blades is equal to 70% by weight of the total material in the round stock from which the blade is formed. As these blades are made of expensive material, in some cases nickel steel, the great loss due to the various manufacturing operations will be apparent.

The objects of my invention are to improve the methods of manufacture whereby the excessive waste of stock above noted is avoided, the cost of manufacturing operations reduced, and a blade of improved construction provided.

Figure 1:
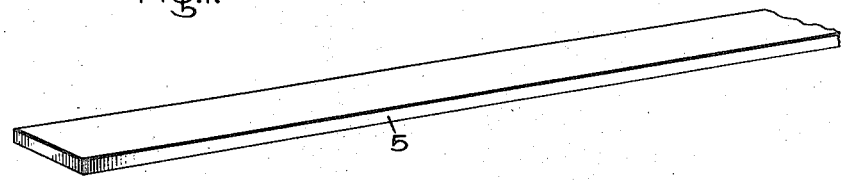
Figure 2:
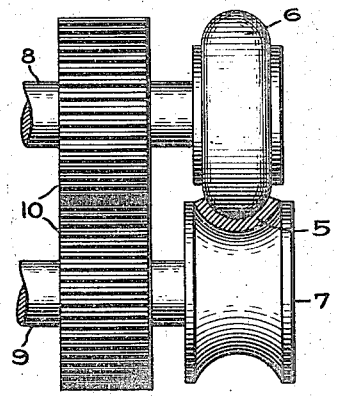
Figure 3:
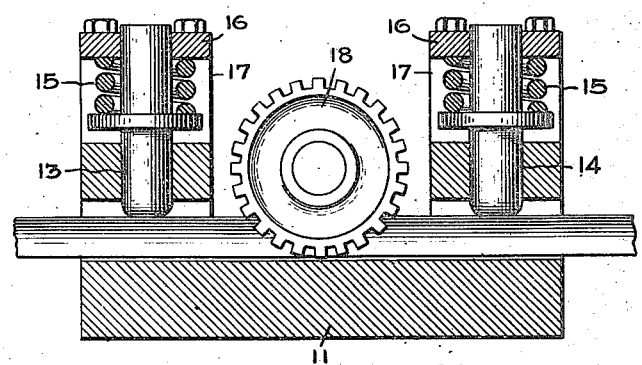
Figure 4:
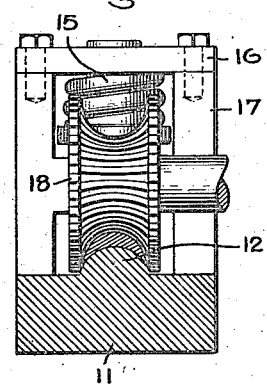
Figure 5:
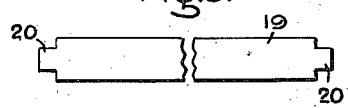
Figure 6:
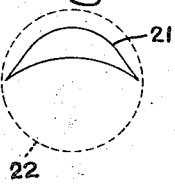

In the accompanying drawing which is illustrative of my invention, Figure 1 is a perspective view of a piece of blade stock; Fig. 2 is an end view of the means for rolling the blade stock to give it the desired curvature; Figs. 3 and 4 are views illustrating the means for milling the edges of the blades; Fig. 5 is a view of a finished blade and Fig. 6 is an enlarged view showing in cross-section the relation between a typical finished blade and a piece of round stock of the size required to make such a blade according to prior methods of manufacture.

5 indicates a piece of sheet stock employed in making the blades. It may be nickel steel or other suitable material. For this purpose strips of the exact width and thickness required may be purchased from the mills, or the stock may be purchased in sheet form of suitable thickness and cut into strips of the desired width. After the strip is cut to the desired width one side or surface is ground or ground and polished in any well known manner to form the working face of the blade. Both sides can be treated if desired, but it is generally sufficient to treat one side only, if the strip is too hard it may be annealed; this should be done before the grinding or polishing operation to avoid injury to the finished surface.

After the strip is properly formed it is passed in a cold state between rollers to give the desired curvature to the working face of the finished blade. The strip may be curved to its final shape in cross-section in one operation or in several operations depending upon the shape of the finished blade, its thickness, etc. To this end a convex roller 6 and a concave roller 7 are employed, which are mounted on shafts 8 and 9, said shafts being positively connected by gears 10 and driven by a suitable source of power. The strip is preferably pulled longitudinally between the rolls at a somewhat higher rate of speed than the rolls themselves by their rotation would tend to feed it. As a result of this the smooth hard faces of the rolls impart to the strip smooth hard and polished surfaces. Another advantage in pulling the strip between the rolls, instead of relying solely on friction to feed it, is that the strip is kept straight and is, therefore, free of bends and twists. The strip may be in short lengths equivalent to a blade, or it may have considerable length from which two or more blades are afterward cut to the desired length. It will be seen that the rollers function as such and also to a certain extent as dies.

After the strip is curved, as shown in Fig. 2, it is necessary to sharpen the entrance and exit edges to prevent shocks to the motive fluid and also to form a passage of the proper cross-sectional area between the adjacent blades. This sharpening can be done in a simple fixture, such, for example, as is shown in Figs. 3 and 4, wherein 11 indicates a base which has a smooth rounded projection 12 on its upper side which conforms to the curvature of the working face of the blade. The purpose of this is to guide the strip in its movement, and to prevent it from being permanently deformed in any particular, especially when subjected to the action of the milling cutter. At the ends of the base are plungers 13 and 14 which have properly rounded ends to prevent injury to the blade stock. These are firmly pressed against the stock by compression springs 15 which rest on collars on the plungers at one end and engage cross members 16 of the housings 17 at the other. Between the plungers is a rotary milling cutter 18 of suitable form to cut away the metal on the sides of the blade back to form the sharpened edges. This cutter is, or may be, of well known construction. It may remove metal from the entire back of the blade or only from the sides as desired. Generally it will be found desirable to remove metal from the sides only, which sides are commonly flat and tangential or substantially so to the curved portion forming the center of the back. As above indicated, the shape of the back may be anything that is desired, it being merely a question of properly shaping the milling cutter. It will be noted that the cutter is so formed as to mill both sides of the back simultaneously. The advantage of this resides in the fact that the stock is not subjected to lateral bending during the operation. Further, by properly shaping the projection 12 the cutter is prevented from removing more stock at one point than another, which would destroy its uniformity, and to a certain extent impair the efficiency of the turbine in which the blade is employed.

In Fig. 5 is shown a finished blade 19. Its ends are cut away to form tenons 20 by means of which it can be secured to its supporting means in any well known manner, as by riveting, welding, etc.

Fig. 6 illustrates very clearly how much stock has to be cut away with the old method of forming blades from solid round stock. 21 indicates the finished blade and 22 the stock from which it was cut, it being noted that the diameter of the stock is slightly greater than the width of the blade.

My improved method of manufacture has the great advantages that it materially reduces the cost of machine operations and saves a large amount of expensive material. It also reduces the cost of tools and special fixtures. By grinding or polishing the strip when flat, which is a very simple operation, and finally finishing with rolls, a much better blade can be obtained than where the polishing is done on curved surfaces, as has been the case heretofore. As will be appreciated, it is a difficult matter to get all of the tool marks out of a curved surface of small radius, which surface terminates in knife-like edges. Aside from the cost of such an operation, there is considerable danger of injuring the sharp edges or having the latter cut the emery cloth which is used for the purpose. My improved arrangement also enables me to do away with the filing operation on the back. As a net result the working face of the blade is very smooth and highly polished, is free from tool marks, the blade is of uniform thickness at corresponding points and has properly sharpened edges with proper entrance and exit angles. It is evident that the shape of the blade in cross-section can be greatly varied from that shown as is sometimes considered necessary, by simply changing the shape of the milling cutter. This avoids the necessity of having a lot of expensive fixtures since one machine can be used for a number of different shapes of blades.

It is preferable to pass the stock between the concave and convex rollers before the sides of the stock are cut away to form the sharpened edges, but under certain conditions it is possible to sharpen said edges before the rolling operations.

What I claim as new and desire to secure by Letters Patent of the United States is:

1. The method of making turbine blades from sheet stock which comprises bending the stock transversely to form the working face of the blade, and removing stock from the sides of the back to form sharpened edges.

2. The method of making turbine blades from sheet stock which comprises pulling the stock between coöperating convex and concave rolls to form the working face of the blade and also to polish it, and removing stock from the sides of the back to form sharpened edges.

3. The method of making turbine blades from flat sheet stock which comprises polishing one of the flat surfaces of the stock, passing the stock between coöperating concave and convex rolls with the polished surface in engagement with the convex roll, and milling the sides of the back of said stock to form sharpened edges.

4. The method of making turbine blades from sheet stock which comprises passing the stock between rolls to give it a curved shape in cross-section, simultaneously milling off the sides of the back to sharpen the edges of the stock, cutting the stock into suitable lengths to form blades, and finishing the ends thereof.

In witness whereof, I have hereunto set my hand this 19th day of April, 1917.

CHRISTIAN STEENSTRUP.